United States Patent [19]

Strizki

[11] 3,967,906
[45] *July 6, 1976

[54] SAFETY BREAK-AWAY GROUND MOUNTED POST SUPPORT ASSEMBLIES

[75] Inventor: Richard A. Strizki, Ringoes, N.J.

[73] Assignee: Transpo-Safety, Inc., New Rochelle, N.Y.

[ * ] Notice: The portion of the term of this patent subsequent to Apr. 20, 1993, has been disclaimed.

[22] Filed: May 2, 1975

[21] Appl. No.: 574,247

Related U.S. Application Data

[63] Continuation-in-part of Ser. No. 470,371, May 16, 1974.

[52] U.S. Cl. .................................. 403/2; 256/13.1; 52/98
[51] Int. Cl.² ........................................ F16D 9/00
[58] Field of Search ............... 403/2; 285/2, 3, 4; 52/98, 99, 758 F; 85/61, 62; 256/13.1, 21

[56] References Cited
UNITED STATES PATENTS

| | | | |
|---|---|---|---|
| 2,085,074 | 6/1937 | Boyles | 403/2 |
| 2,249,848 | 7/1941 | O'Brien | 403/2 |
| 2,282,641 | 5/1942 | Corey | 285/2 |
| 2,305,377 | 12/1942 | Corey | 285/2 |
| 3,002,775 | 10/1961 | Muller et al. | 285/2 |
| 3,343,322 | 9/1967 | Lurkis et al. | 52/298 |
| 3,499,630 | 3/1970 | Dashio et al. | 52/98 X |
| 3,521,413 | 7/1970 | Scott et al. | 403/61 X |
| 3,637,244 | 1/1972 | Strizki | 403/2 X |

Primary Examiner—Robert L. Wolfe
Assistant Examiner—Doris L. Troutman
Attorney, Agent, or Firm—Lackenbach, Lilling & Siegel

[57] ABSTRACT

An assembly for supporting a sign post or the like which releases the same upon impact by a vehicle includes a lower support member connected to a stationary footing and an upper support member fixedly connected to the post. The upper support member is releasably connected to the lower support member by means of breakaway coupling members which have weakened portions between the support members. Each coupling member is adapted to be severed upon application of a combination of excessive bending moments and axial forces thereto. The upper support member has load concentrating elements projecting therefrom which cooperate with the coupling members to equalize the bending moment produced thereto only upon application of wind load or the like to the signpost or the like at a point remote from the upper support member. The assembly compensates for or negates the effect of the bending moment produced from wind loads while impact of the post by a vehicle proximate to the upper support member is not compensated for by the assembly and readily releases and displaces the post to minimize damage to the automobile and injury to its occupants.

26 Claims, 11 Drawing Figures

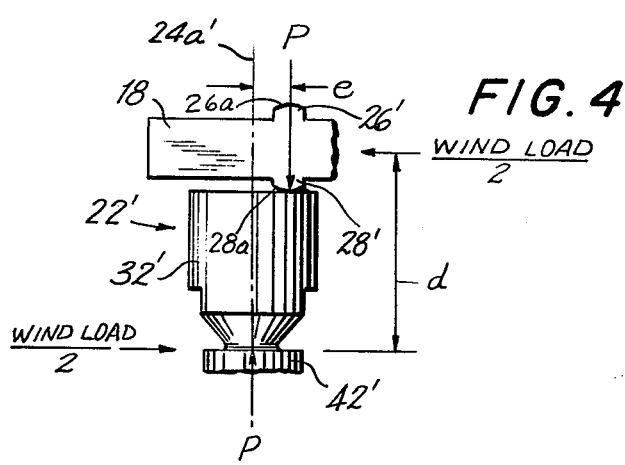
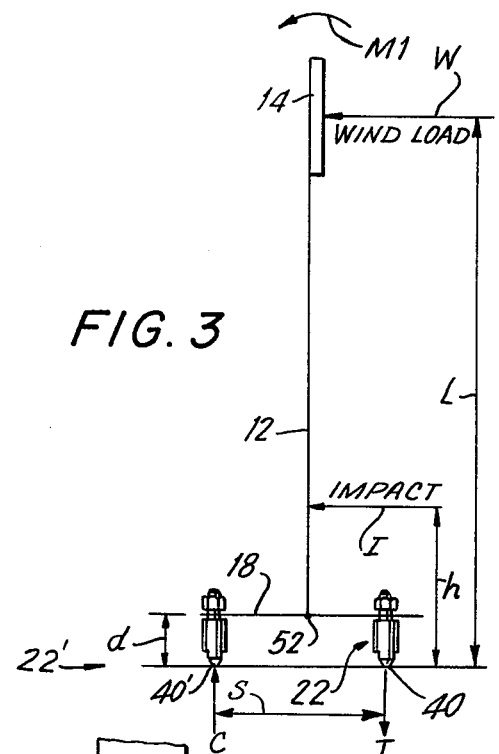
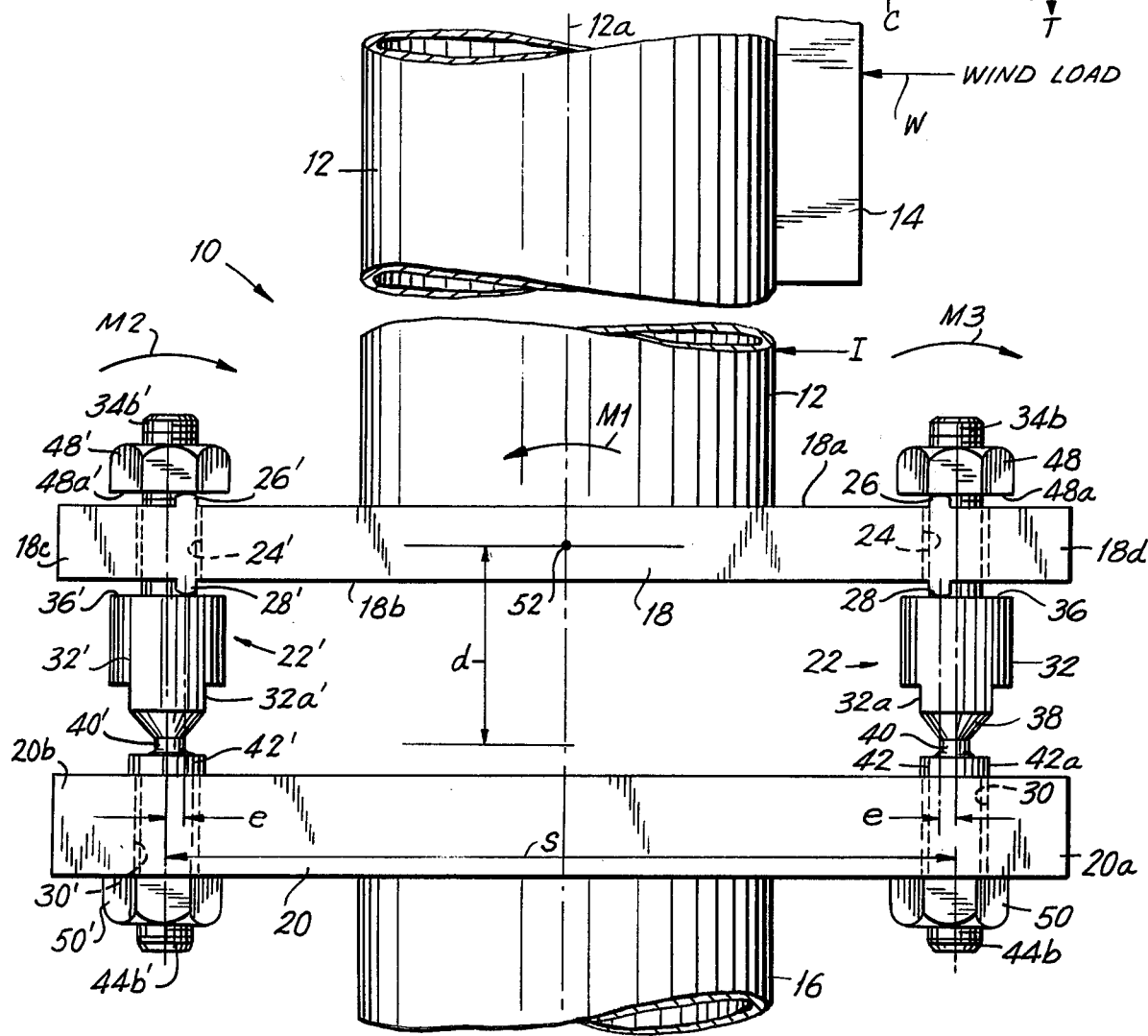

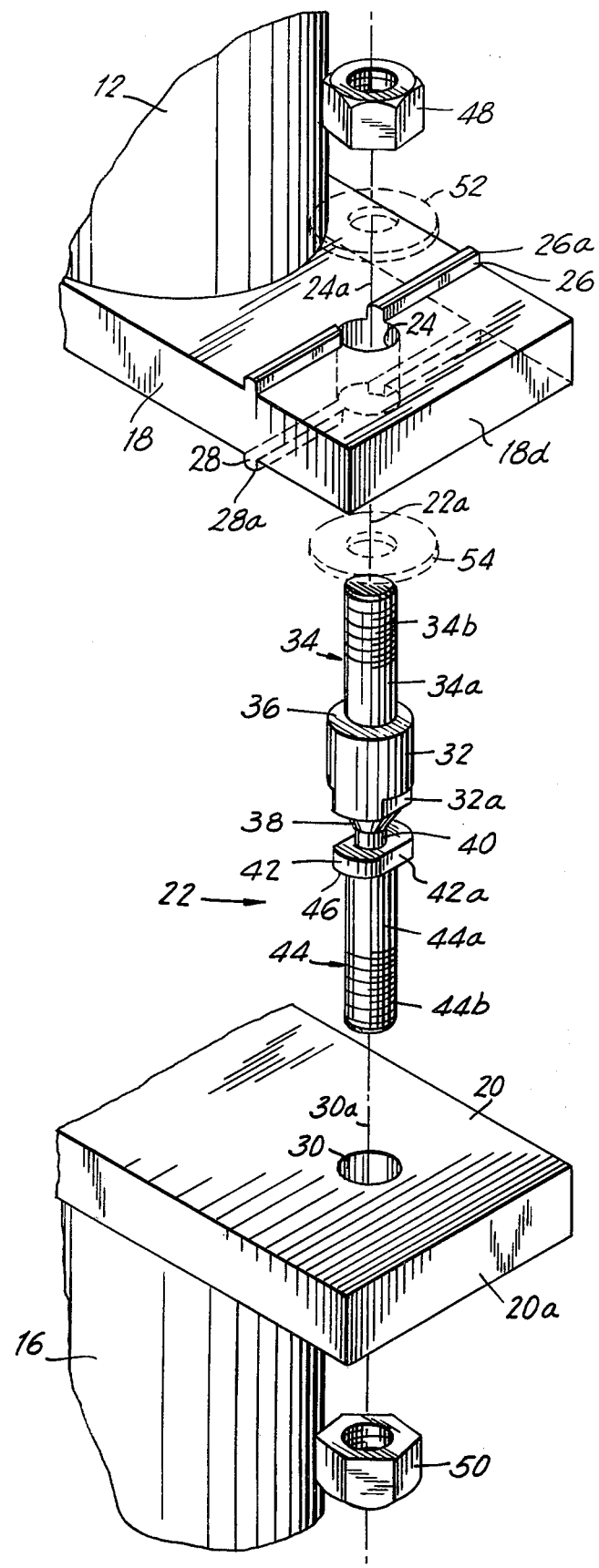

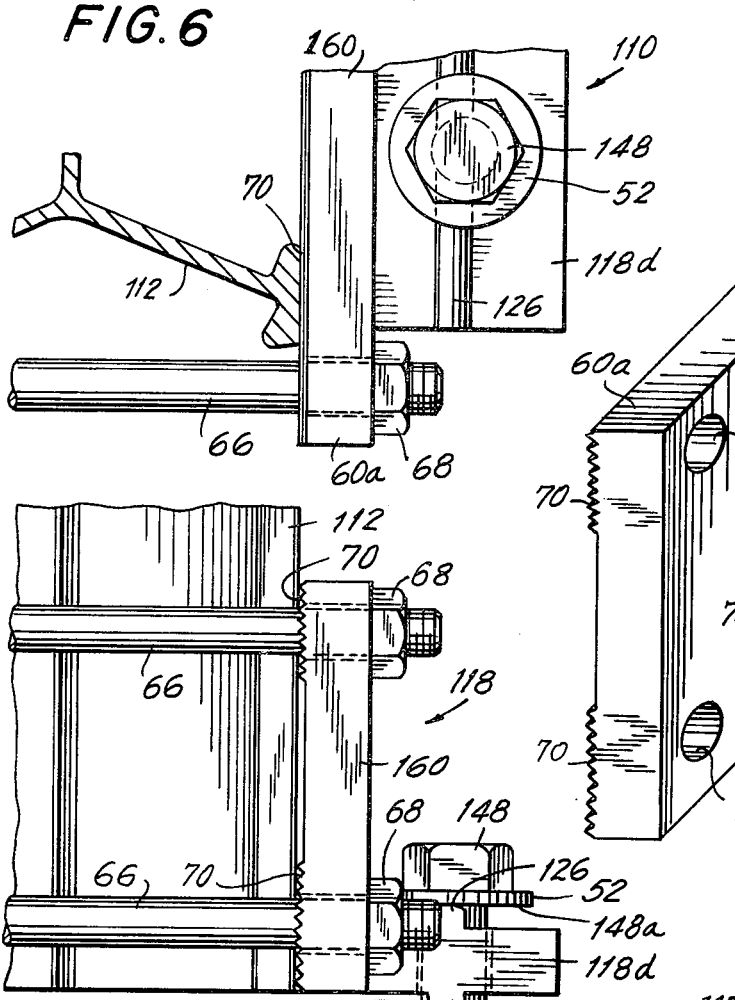
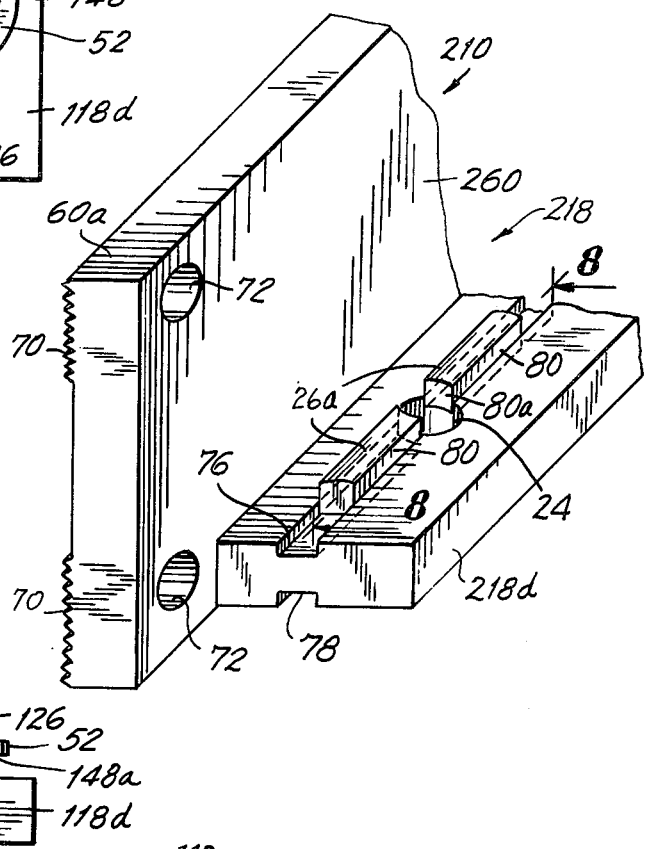
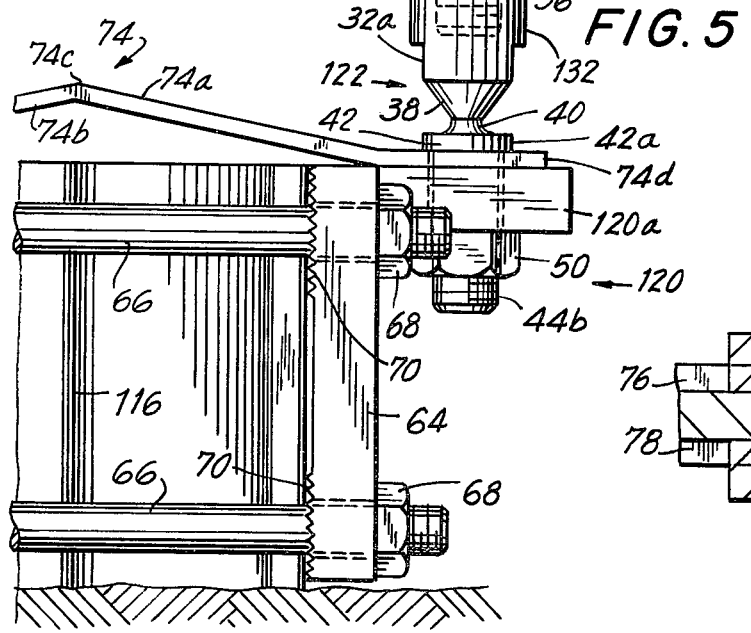
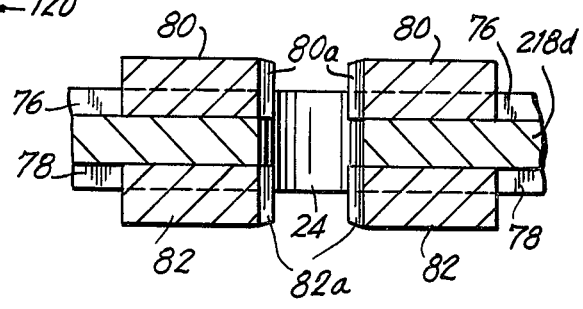

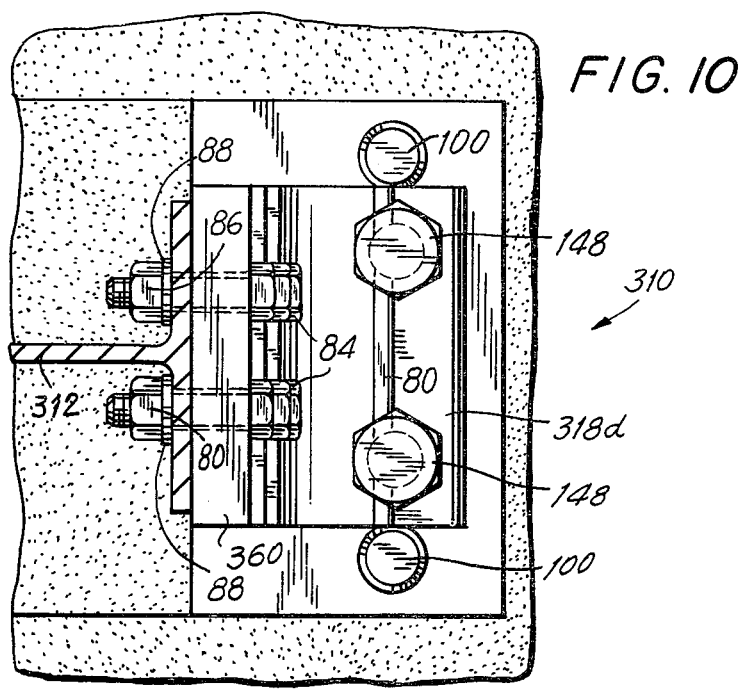
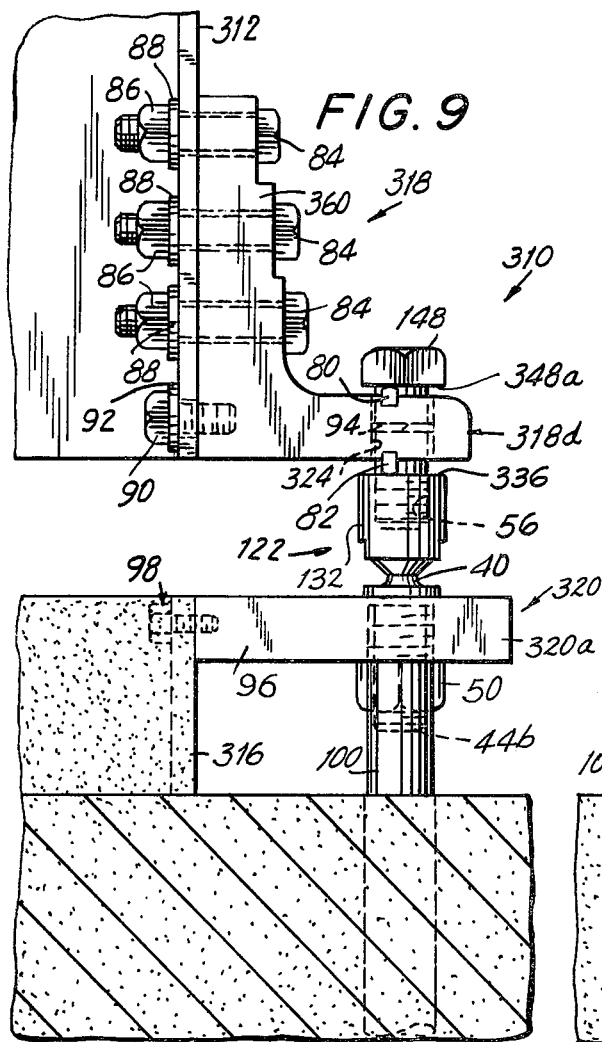
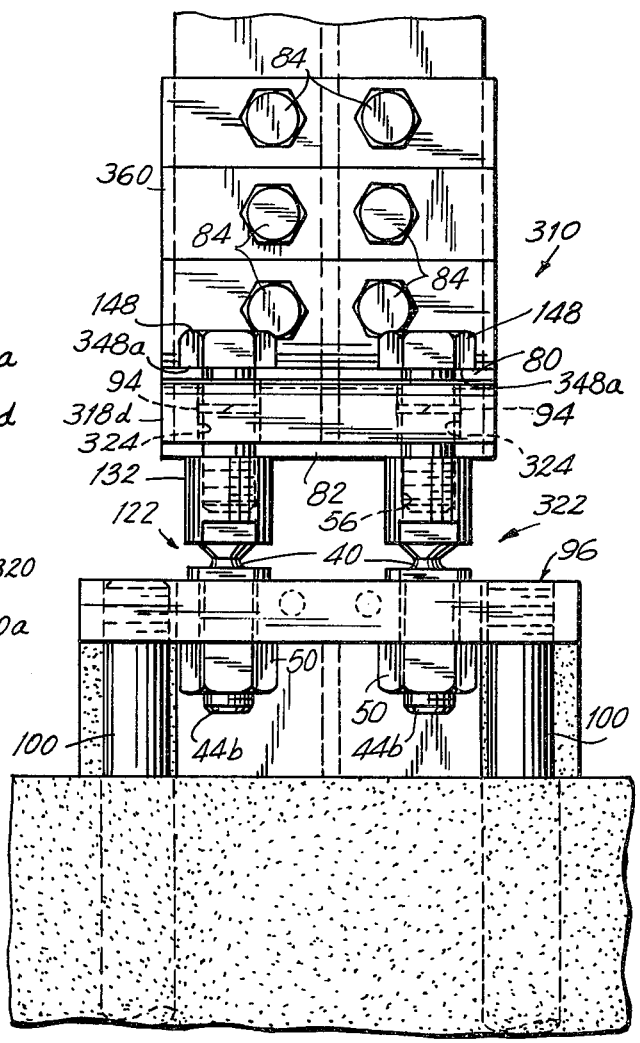

SAFETY BREAK-AWAY GROUND MOUNTED POST SUPPORT ASSEMBLIES

CROSS-REFERENCE TO RELATED APPLICATION

This application is a Continuation-In-Part application of my co-pending U.S. application Ser. No. 470,371, filed May 16, 1974.

BACKGROUND OF THE INVENTION

The present invention generally relates to roadside post supports, and more particularly to safety breakaway ground-mounted post support assemblies which release the post upon impact by a vehicle.

In the interest of highway safety, it has been suggested that highway signs, utility poles and the like should be so constructed that damage to a vehicle and injury to its passengers upon impact with such an obstruction be minimized as much as possible. For this purpose, various types of breakaway couplings and yieldable supports for signs and posts have been suggested as exemplified by U.S. Pat. Nos. 2,961,204 and 3,521,917.

A more sophisticated breakaway coupling assembly is shown and described in my U.S. Pat. No. 3,637,244.

The coupling assembly disclosed in this patent was designed to solve drawbacks in the existing technology by allowing for all directional impact angles, consistence of performance without periodic adjustments, use of the existing types of footings and posts, and no adverse effects to vehicle impact when wind load is present on the sign at impact. While successful, the coupling assembly of my earlier patent was overly complex and had a high error risk in selection and placement of parts, thereby increasing the chance of field error in installation and maintenance, which error could defeat the safety feature which the assembly was intended to provide.

An improved breakaway assembly is disclosed in my above co-pending application Ser. No. 470,371. The improved assembly substantially reduces the number of parts thereby reducing the chances of field error. Additionally, since fewer parts must be handled, the assemblies can be installed more conveniently and more efficiently.

This Continuation-In-Part application further discloses the principles set forth in the co-pending application as well as discloses additional structural embodiments which incorporate my invention.

SUMMARY OF THE INVENTION

Accordingly it is an object of the present invention to provide an improved breakaway assembly for mounting a road sign post or the like upon a base which overcomes the above disadvantages inherent in the comparable prior art devices.

It is another object of this invention to provide an improved breakaway assembly of the type under consideration which is simple in construction and economical to manufacture.

It is still another object to provide an improved breakaway assembly wherein the critically positioned elements are initially fixedly joined to the assembly members to minimize field installation errors.

It is yet another object to provide an improved breakaway assembly as suggested in the above objects wherein the post may be released or separated from the base upon impact by a vehicle over all impact angles.

It is a further object of this invention to provide an improved breakaway assembly which requires substantially fewer parts than the comparable prior art assemblies.

It is still a further object of this invention to provide an improved breakaway assembly which materially facilitates installation and maintenance in the field as compared with earlier known units.

It is yet a further object to provide a breakaway assembly which can be used in conjunction with new or existing footings for posts.

In order to achieve the above objects, as well as others which will become apparent hereafter, the present invention is for a breakaway assembly for supporting an elongate post or the like at one end thereof. The post generally defines an axis and may be subjected to negligable vertical and transverse forces along a predetermined direction at the other end thereof, and to transverse forces proximate to the supported end. The assembly includes spaced upper and lower support means, said lower support means including means for fixedly anchoring the same to a support surface. Said upper support means is fixedly connected to the post and has at least two portions thereof spaced from each other along a line substantially parallel to said predetermined direction. Each of said spaced portions are provided with at least one opening therethrough, said openings having axes substantially parallel to the axis of the post. Two openings, each on a different one of said associated spaced portions, define a pair of associated openings. Said spaced portions have opposing surfaces respectively facing toward and away from said lower support means. A coupling member is associated with each opening in said spaced portions, each coupling member extending between an associated spaced portion and said lower support means. Each coupling member is provided with a weakened portion disposed between said upper and lower support means and is fixedly connected at one end to said lower support means. The other end of each coupling member extends through an associated opening and defines two spaced bearing surfaces each of which faces a different one of said opposing surfaces of said spaced portions. Protuberance means is provided which is joined to and projects from each of said opposing surfaces of said spaced portions. One of said protuberance means is disposed between one of said opposing surfaces and an associated bearing surface of a coupling member and is in abutting relationship against the latter. Another protuberance means is disposed between the other of said opposing surfaces and an associated bearing surface of a coupling member and is in abutting relationship against the latter. Each protuberance means is eccentric to the axis of an associated opening to dispose the same inwardly in the space between the pair of associated openings. In this manner, a transverse force acting on the post results in a first moment exerted at said weakened portions which is a function of the axial or vertical distance between said upper suport means portions and said weakened portions of said coupling members. However, tendencies of the post to pivot at its point of connection to said upper support means is translated into forces which are applied by said protuberance means to said bearing surfaces eccentrically with respect to the axes of said coupling members to produce a second moment applied to said weakened portions which acts in an opposite direction to that of said first moment. The distances $e$ between said protuberance means and said openings are selected to provide substantial compensation between said first and second moments only when forces are applied to the post remote from the point of connection to said upper support means which result in development of substantial forces which act through said protuberance means.

BRIEF DESCRIPTION OF THE DRAWINGS

While the invention is particularly pointed out and distinctly claimed in the concluding portions herein, preferred embodiments are set forth in the following detailed description which may be best understood when read in connection with the accompanying drawings, in which:

FIG. 1 is a fragmented side elevational view of a breakaway coupling assembly in accordance with the present invention;

FIG. 2 is a fragmented and exploded perspective view of the elements employed in the coupling assembly shown in FIG. 1;

FIG. 3 is a diagrammatic illustration of a sign post mounded on an assembly of the type shown in FIGS. 1 and 2, indicating the directions of the forces generated under normal wind and impact conditions; (since vertical dead loads are negligible they have been neglected);

FIG. 4 is a diagrammatic illustration of a single coupling member and an associated portion of a support member supporting a post, showing how the eccentric load concentrating elements compensate for wind loads;

FIG. 5 is a fragmented side elevational view of a further embodiment of a breakaway coupling assembly in accordance with the present invention;

FIG. 6 is a fragmented top plan view of the embodiment shown in FIG. 5;

FIG. 7 is a fragmented perspective view of one of the clamping brackets of the type shown in FIGS. 5 and 6, but showing extruded grooves in the upper support member for receiving stainless steel inserts to serve as load concentrating elements;

FIG. 8 is a cross-section of the upper support member shown in FIG. 7, taken along line 8—8;

FIG. 9 is a fragmented side elevational view of a still further embodiment in accordance with the present invention;

FIG. 10 is a fragmented top plan view of the embodiment shown in FIG. 9; and

FIG. 11 is a fragmented side elevational view of the embodiment shown in FIGS. 9 and 10.

DESCRIPTION OF THE PREFERRED EMBODIMENTS

Referring now specifically to the figures, in which indentical or similar parts are designated by the same reference numerals throughout, and first referring to FIGS. 1 and 2, a first presently preferred embodiment of the coupling assembly in accordance with the present invention is generally designated by the reference numeral 10.

The coupling assembly 10, to be specifically described below, is suitable for supporting a post 12 carrying, for example, a sign 14 or for supporting other like roadside structures on a footing 16 which is embedded in or otherwise attached to the ground and for releasing the post 12 from the footing 16 upon impact by a vehicle.

The coupling asembly 10 includes an upper support member 18, shown in the nature of a flat platform, which is fixedly connected to the post in any conventional manner. Similarly, a lower support member 20 is in the nature of a flat platform which is connected in any conventional manner to the footing 16. The platforms 18, 20 are co-extensive with one another and are spaced from each other in substantially horizontal planes.

In the embodiment being described, the platform is releasably connected to the platform 20 by two spaced breakaway coupling members 22, 22'. The coupling assembly 10 permits the platform 18 and the post 12 to be released from the platform 20 and the footing 16 upon impact by a vehicle. However, the assembly substantially compensates or negates the effects of wind loads on the signs to insure that the breakaway couplings 22, 22' do not fail under the action of such wind loads.

The upper support member of platform 18 has an upper surface 18a which faces away from and a lower surface 18b which faces in the direction of the lower support member or platform 20. The platform 18 is shown as deifining at least two portions 18c, 18d thereof which are spaced from each other along a line substantially parallel to the anticipated direction of the wind load.

In the description that follows, only the structure shown on the right hand side of FIG. 1 and in FIG. 2 will be described. However, the same description is equally applicable to the structure on the other side or on the left hand side of FIG. 1. The corresponding or similar elements are designated by the same reference numerals on the left hand side except that they are primed.

The portion 18d of the upper platform 18 is provided with a hole or aperture 24 which has an axis 24a which is substantially parallel to the axis 12a of the post. Protuberance means, shown in the form of bosses 26 and 28 project from respective surfaces 18a and 18b of the upper platform 18 and extend proximate the hole 24. Each protuberance, in the form of an integral boss, is disposed eccentrically relative to the axis of an associated opening to dispose the same inwardly in the space between the pair of associated openings 24, 24'. The degree of eccentricity, namely the spacing between the centerline of the boss and the axis of the opening is designated by $e$ in FIGS. 1 and 4. In accordance with one presently preferred embodiment, the upper platform 18 is extruded, such as from aluminum, and the integral bosses 26 and 28 are similarly and simultaneously extruded. In this manner, by initially locating and permanently joining the bosses 26, 28 to the upper platform 18, the positions thereof are secure and field errors in accurately positioning these bosses is clearly eliminated. For reasons which will become apparent hereafter, each of the bosses 26, 28 has a rounded end or top surface 26a, 28a, as best shown in FIG. 4, respectively, which can be suitably formed during the extrusion process.

The lower support platform 20 is similarly provided with spaced portions 20a, 20b. Portion 20a is provided with a hole or aperture 30 having an axis 30a which, when the platforms 18, 20 are horizontally aligned, becomes axially aligned with the axis 24a of the hole 24.

The details of one presently preferred embodiment of a breakaway coupling 22, is shown in FIG. 2. The coupling 22 is shown to have an upper cylindrical portion 32, formed with lower wrentching flats 32a and an upwardly extending stud 34 having a smaller diameter than the cylindrical portion 32 to define a bearing surface 36. The stud 34 includes an intermediate, unthreaded portion 34a and an end threaded portion 34b. Extending in the opposing direction from the upper cylindrical portion 32, there is a downwardly tapered conical surface 38 which terminates in a neck portion 40 of reduced cross-sectional area which defines a breakaway sectional point adapted to be severed or fail by excessive bending moments under conditions to be described hereafter. A lower cylindrical portion 42 provided with wrentching flats 42a is connected to the neck portion 40 and a downwardly extending stud 44 of smaller diameter defines an under surface 46 which is adapted to bear against the lower platform 20. The stud 44 has an intermediate unthreaded portion 44a and an end threaded portion 44b.

For reasons which will become apparent hereafter, the upper and lower platforms 18, 20 may be made from aluminum or any other suitable material capable of supporting the anticipated loads. However, the breakaway coupling members 22 are advantageously made from high tensile alloy steel. For example, AISI 4130 or 4340 alloy steel with a minimum tensile yield stress of 165,000 psi and an ultimate tensile range of 180,000 to 215,000 psi has been found to be satisfactory. The Rockwell C Hardness for the steel has been established at a minimum of 26. The coupling members 22, which are machined from such steel, have been pretested to have breaking tolerances in the range of 47,000 to 57,000 lbs. for large couplings and 17,000 to 21,000 lbs. for small couplings.

A typical procedure for mounting a post 12 on to a coupling assembly 10 and a footing 16 will now be described. The upper platform, or the equivalents thereof to be described hereafter, is fastened or fixedly connected to the post 12. Each stud 34 is passed through an associated hole 24 and the threaded portion 34b is threadedly engaged by a nut 48. The nut 48 is tightened to somewhat prestress the bosses 26, 28. The post 12 is next raised and placed in a position to bring the axes 22a of the couplings 22 into alignment with the axes 30a of the lower platform 20. The coupling members 22 are lowered to pass the threaded portions 44b thereof through the respective hole 30 and threadedly engaged by a nut 50. The nuts 50 are tightened so as to securely connect the couplings 22 to the lower platform. Once the post 12 is so mounted, a sign 14 or other supported member is fixed to the top or remote end of the post. This procedure is only illustrative and any other sequence of steps may clearly be utilized to assemble the structure. Each coupling member 22 defines two spaced bearing surfaces each of which faces a different one of the opposing surfaces 18a and 18b of the platform 18. The lower bearing surface is the surface 36 on the upper cylindrical portion 32 while the upper bearing surface is defined by the surface 48a of the nut 48 which abuts against the upper boss 26.

The coupling assembly 10 will normally use four or more coupling members 22 arranged in pairs of two. Each pair of coupling members includes two coupling members one of which is connected to the spaced portion 18c and the other of which is connected to the spaced portion 18d and both of which are arranged along a line substantially parallel to the anticipated wind load direction or normal to the plane of the sign 14. In the embodiment being described only one pair or two such coupling members have been depicted to simplify the description of the structure.

The holes 24, 24' are dimensioned to receive the studs 34 with little clearance. This is to ensure close control or maintenance of the important dimension e during field installation. However, some clearance within the holes 24 may be desirable to prevent application of moments to the coupling members 22 upon bending or deformation of the upper platform 18, as will be more fully described in connection with FIGS. 9 and 10.

To describe the operation of the invention, reference is made in FIGS. 1, 3 and 4 where a wind load or other similar force W is shown to be applied at the end of the post 12 remote from the connected end. The wind load W is shown to be applied to the post a distance L above the level of the weakened or neck portions 40, 40' of the coupling members. In this connection, it must be appreciated that the wind load could be exerted from any direction. However, in all cases the resultant horizontal vector of interest is that applied to the pole parallel to the ground and substantially parallel to the anticipated direction of the wind load, and therefore to the lines extending between associated pairs of coupling members 22, 22'.

The wind load applied to the top or remote end of the post 12 causes the same to tend to rotate towards the left from its normally upright or vertical position about a point 52 which is a hypothetical point where the axis 12a of the post passes through the upper platform 18. The post 12 will thereby tend to rotate in a counterclockwise direction about the point 52. This counterclockwise tendency to turn or moment is designated by the arrow M1. This rotational moment causes the upper platform 18 to exert a downward force on the coupling member 22' by reason of the pressure applied by the boss 28' against the bearing surface 36'. The rotational moment M1 will also cause the upper boss 26 to exert a pressure upon the bearing surface 48a and thereby exert an upward force on the nut 48. However, since the boss 28' is eccentric with respect to the axis of the coupling member 22', a force will be exerted on the coupling member 22' which will tend to rotate the coupling member 22' in a clockwise direction as suggested by the arrow M2. Similarly, the upper boss 26 is eccentric with respect to the axis of the coupling member 22 and will create a force on the nut 48 which will act upward on the coupling member 22 and tend to rotate the coupling member 22 in a clockwise direction as indicated by the arrow M3.

The magnitude of the counteracting forces M2 and M3 can be controlled by selection of the critical distances e between the center lines of the bosses 26, 28 and the axes of the respective coupling members 22. The critical distances e are chosen such that the moments $M_2$ and $M_3$ will be equal to and compensate for the moments which are applied at the breakaway sections 40, 40' as the result of the wind load, as will now be described. More specifically, the horizontal wind load W is directly applied to the coupling members 22, 22' by way of the upper platform 18. These horizontal forces for simplification are assumed acting at a level d above the breakaway sections 40, 40' generating moments which tend to bend or rotate the coupling members 22, 22' in a counterclockwise direction. Accordingly, it is these moments applied to the coupling members, due to the tendency of the upper platform 18 to move in the direction of the wind, which are compensated by the action of the bosses or protuberances 26, 28 resulting in equalizing moments M2 and M3. As a result of the action of the eccentrically disposed bosses 26, 28, the coupling members 22, 22' are not broken or severed due to wind loads when the wind load is applied to the pole at a point relatively distant from the couplings, such as 8 to 20 feet.

However, the coupling assembly 10 exhibits the characteristic that upon impact of a vehicle with the post 12 at a level proximate to the upper platform 18, little of the above-described compensation results and sufficient bending moments are generated which sever or break the coupling members 22, 22' and release the post 12 on the upper platform 18 from the lower platform 20 and the footing 16 to minimize damage to the vehicle and injury to the passengers.

The situation presented upon impact of the vehicle with the post 12 differs from that presented by the above-described anticipated wind loads in that the impact force I is generally applied to the post at a point approximately 18 inches to 2 feet above the point 52 about which the post and the upper platform 18 tend to tilt. The lever arm through which the horizontal force I is applied to tilt the platform on impact will therefore only be approximately 18 inches to 2 feet, whereas the lever arm through which the normal wind load W acts is substantially greater and, as indicated above, may be between 8 to 20 feet or more.

The eccentricity $e$ of the bosses 26, 28 with respect to the axes of the coupling members 22, 22' is selected to compensate only for the wind loads applied at the remote end of the post but not to the impact forces applied proximate to the coupling assembly 10. The application of an impact force is not compensated for by the designed eccentricity $e$ and as a result the opposing or compensating moments $M_2$ and $M_3$ under impact will not balance the bending moment produced by the force I at the weakened portions 40, 40'. The pole 12 and the upper platform 18 will thereby be released from the lower platform and the footing due to the failure of the coupling members and the severance thereof. Once the coupling members 22, 22' have been severed, the post is released from its foundation so that it may readily move in response to the advancing vehicle and damage to the vehicle and injury to the passengers is thereby minimized. Additionally, since the post is normally not materially damaged, the post 12 may normally be replaced by restoring the same to its original erect position and replacing the severed or broken coupling members 22, 22'.

Referring to FIGS. 1, 3 and 4, a simplified numerical example will now be given to further illustrate the operation of the present invention. However, for purposes of the example, it will be assumed that two pairs or a total of four coupling members are used to support the upper support member on the lower support member. If it is assumed that the normal wind load W has a magnitude of 2,000 lbs. and is applied to a sign supported on a post at a level L 20 feet above the breakaway points 40, 40' the post 12 will tend to bend the upper platform 18 and will exert a bending moment of 2,000 × 22, or 40,000 ft. lbs. at the critical sections 40, 40' of the coupling members. The upper platform 18 will apply loads through the bosses 26, 28, 26', 28' to the coupling members 22, 22'. These forces are applied in opposite directions on the two sides of the post 12 and are spaced inwardly from the vertical axes of the coupling members by the eccentricity distance $e$ which, in this case, is taken to be 0.01 feet. It is assumed in the example that there are two pairs of couplings each as is shown and described in FIGS. 1–4. The two coupling members of each pair being spaced from each other a distance $s$ 1 foot along a direction substantially parallel to the anticipated direction of the wind load. In this instance, the moment $M_1$ of 40,000 lbs. is divided equally between each pair of coupling members and, since the coupling members are spaced 1 foot apart, there is applied 20,000 lbs. of vertical load on each coupling member. The vertical force acting on the coupling member 22 will be a tension force T while it will be a compression force C acting on the coupling 22'. The vertical forces of 20,000 lbs. at each coupling will be applied by the platform portions 18c, 18d to the couplings 22' and 22 respectively, by means of the eccentrically positioned upwardly projecting boss 26 and downwardly projecting boss 28'. The resultant rotational moment applied to each coupling will be 20,000 × 0.01 = 200 foot-pounds. Accordingly, the wind load W translates into moments M2 and M3 of 200 foot-pounds acting upon the respective couplings and tending to bend the same in a clockwise direction about the weakened portions 40, 40'.

The horizontal wind load W of 2,000 lbs is also a horizontal force which tends to move the upper platform 18 towards the left or in the direction of the wind load, such tendency of the platform to move laterally also applies forces to the coupling members which, acting through a moment arm equal to the distance $d$ result in moments acting in a counterclockwise direction about the weakened portions 40, 40'. The applied horizontal load of 2,000 lbs will be assumed to be equally divided between the four coupling members and supplied to the coupling members through the centerline of the upper platform 18 for simplification. If the distance $d$ between the center of the upper platform and the critical sections 40, 40' of the coupling members is taken to be 0.4 feet, there would be a counterclockwise moment applied on each coupling member produced by this horizontal load of 2,000 × ¼ × 0.4 = 200 foot-pounds. Thus, the moments produced by the horizontal wind load W is equal and opposite to the moments M2 and M3 produced by the tendency of the post 12 to rotate about the point 52. The moments thereby cancel and result in no bending moment at the critical sections 40, 40' of the coupling members. It is thereby noted that the provision of the bosses 26, 28, 26' eccentrically positioned and inwardly disposed between the associated pair of openings 24, 24' substantially compensates for the wind loads and prevents the failure of the coupling members 22, 22' due to the action of such wind loads.

A formula which summarizes the above relationships which compensates for the wind load forces, and which results in zero bending moment condition at the critical sections 40, 40', is as follows:

$$e \times (C \text{ or } T) = \frac{\text{Wind load}}{n} \times d$$

where
$n$ is the number of couplings
(C or T) is the axial load in the couplings
The above formula has been determined to be accurate for most practical purposes, although it does not take into account second order or second degree factors such as the weight of the structure, including ice loads, and variations in the manner in which the horizontal load is distributed between the compression and tension couplings.

Consideration will now be given to the condition when a vehicle collides with the post 12. Assuming an impact force I of 10,000 lbs. applied at a point $h$ 18 inches above the critical sections 40, 40' of the coupling members, there is a bending moment of 15,000 foot-pounds at the critical sections. Since two pairs of couplings are provided, and these couplings are spaced a distance $s$ of 1 foot, the vertical loads on each coupling will be $15,000/(1 \times 2) = 7,500$ lbs. In this case, the eccentric loading will apply a rotational moment M2, M3, to each coupling of $7,500 \times 0.01 = 75$ foot-pounds. However, the applied impact load I of 10,000 lbs. applied transversely or horizontally to the post 12, divided equally between the four couplings, will give a moment of $10,000 \times \frac{1}{4} \times 0.4 = 1,000$ foot-pounds about each coupling. Accordingly, there is an imbalance of $1,000 - 75 = 925$ foot-pounds. Since the compensating moments M2, M3 generated by the bosses 26 and 28' is substantially less than the moments acting over the distance $d$, severe bending will take place at the critical sections 40, 40' of the coupling members sufficient to sever the same and release the upper platform 18 and post from the lower platform and the footing. The platform 18 and the post 12 will thereby be forceably thrust towards the left, as viewed in the figures, with the advancing vehicle to thereby minimize damage thereto and injury to the passengers.

Numerous modifications may be made to the coupling assembly 10 without departing from the spirit of the present invention. For example, referring to FIGS. 5 and 6, there is shown a second embodiment 110 of the coupling assembly. Here, the upper and lower support members 118 and 120 respectively are each in the form of an L-shaped bracket. The upper support member 118 has an upright connecting portion 160 and a supporting portion 118d which corresponds to the portion 18d in the embodiment shown in FIGS. 1 and 2. Similarly, the lower support member 120 has an upright connecting portion 64 and a supporting portion 120a. The supporting and connecting portions in each case are substantially normal to each other. Only one bracket forming each support member is shown, it being understood that a similar or substantially symmetrical arrangement is provided on the opposing side of the post 112. Referring to FIG. 6, the post 112 is shown as a double U-post and the connecting portions 160 are each provided with lateral extensions 60a which extend beyond the post 112 to thereby clear the same on opposing sides thereof. The L-shaped brackets or upper support members 118 are securely fixed to the post 112 by means of bolts 66 and nuts 68. To enhance the grip of the brackets, both with respect to the post 112 as well as the footing 116, the upright connecting portions 160 and 64 respectively are provided with longitudinal pointed teeth 70 which advantageously "bite" the members which they abut against.

The upper supporting member 118 and lower supporting member 120 are advantageously made from a light weight material such as aluminum since the damage to the vehicle upon impact is proportional to the mass of the post and upper platform. Accordingly, reduction in the total mass which is to be displaced facilitates release of the post and platform with minimal damage to the vehicle and injury to the passengers. However, the use of aluminum to form the bosses 26, 28, 26' and 28' in FIG. 1 and bosses 126 and 128 in FIGS. 5 and 6, is frequently not satisfactory when high axial loads C and T are produced. As it will be appreciated, these bosses or "load concentrating elements" are subjected to substantial bearing stresses from the axial loads. Since aluminum does not have a very high bearing value, substantial axial loads produced by wind loads on large sign areas may deform and damage these bosses. To alleviate this problem, when the axial loads are relatively high, washers 52 and 54 may be utilized and each interposed between the above-described bearing surfaces of the coupling members. These washers are shown in dashed outline in FIG. 2 as being optional. In FIGS. 5 and 6 these washers are shown mounted in the assembly 110, each washer defining new bearing surfaces 148a and 136 which respectively abut against the bosses or "load concentrating elements" 126 and 128 respectively. As is best depicted in FIG. 6, by selecting the diameter of the washers greater than the cross dimensions of the heads of the bolts 148, a greater length of the bosses 126 and 128 are caused to abut against the bearing surfaces 148a and 136 respectively. These forces are thereby distributed over greater surface areas, preventing, in some instances, the deformation or damage to the bosses.

There is also shown in FIG. 5 a modified construction of coupling members. Thus, the breakaway coupling member 122 is provided with an upper cylindrical portion 132 similar to the cylindrical portion 32 of the coupling 22. However, a drilled and tapped hole 56 is axially provided in the cylindrical portion 132, which is dimensioned and threaded to receive a bolt 148. Once the bolt 148 is threadedly received within the hole 56 and tightened, the operation of the coupling member 122 is the same as described above.

Referring to FIG. 5, there is shown a lift plate 74 which substantially covers the lower support member 120 and the footing 116. The lift plate 74 has upwardly rising inclined surfaces 74a and 74b which extend from horizontal portions of the lift plate proximate to the coupling members 122, such as at 74d. The inclined surfaces rise upwardly as shown towards a point 74c intermediate the spaced pair of coupling members. In this manner, severance of the coupling members at the weakened portions 40 causes at least one of the coupling members above the weakened portion to slideably move over an associated inclined surface and cause the post 112 to rise above or clear the lower support member 120 while moving laterally with respect to the same to assure free movement and release the post upon impact. Accordingly, the lift plate 74 prevents the upper part of the broken couplings to drop in to the voids between the post and engage the same. Such engagement would inhibit free lateral movement of the post, and may increase the damage to the vehicle or injury to the passengers. Additionally, the lift plate 74 provides an upward lift. The initial upward lift when the post is broken assists in raising the post over the vehicle as the vehicle continues to advance under the post. This is particularly true when the structure only includes a single post. When two or more posts support a single structure, such as a large sign, the initial upward lift is frequently instrumental to shear the bolts which attach the sign to the post to thereby release the post from the sign, and freeing it from the additional restraint of the sign and remaining post, thus placing less resistance on the impacting vehicle. For these reasons, the lift plate 74 is an important modification which still further minimizes the possible damage and injury which can result on collision.

Referring to FIG. 7, there is shown a still further embodiment of the coupling assembly and designated as 210. Only the upper support member 218 is shown, it being understood that the lower support members as well as the complementary support members on the other side of the post are similarly configurated. The upper support member 218 has a supporting portion 218d which corresponds to the portion 18d of the embodiment 10. The connecting portion or gripping portion 260 is provided with the lateral extensions 60a as described in connection with the embodiment 110, which extensions are provided with holes 72 for receiving the through bolts 66 for attaching the bracket members or supporting members to the post, in the case of the upper members, or to the footing, in the case of the lower support members.

The modification in the embodiment 210 of FIG. 7 resides in the nature in which the bosses of "load concentrating elements" are provided on the supporting portion 218d. In the embodiments thus far described, the bosses have been integrally formed with the upper support members, such as by extruding these bosses simultaneously with the extrusion of the support members. However, as suggested above, aluminum bosses are limited in the bearing stresses which they can be subjected to without being deformed or damaged. While washers, as above described, can somewhat relieve this problem, an alternative approach is to utilize harder bosses or "load concentrating elements". In FIG. 7, the supporting portion 218d is extruded or otherwise formed with an upper rectangular groove 76 and a lower rectangular groove 78 or the like. Referring to FIGS. 7 and 8, inserts 80 and 82 forming the bosses or "load concentrating element" are press fitted within the respective upper and lower grooves as shown. The metal inserts 80, 82 are advantageously made from a hardened stainless steel material or the like which has bearing values substantially greater than that of aluminum.

In all the embodiments described, it is advantageous that the load concentrating elements extend from the very periphery of the holes in the supporting portions so as to increase the length of these bosses which are in abutment against the bearing surfaces of the coupling members. As described above, such arrangement distributes the load over greater areas and therefore minimizes the possibility of deformation or damage of the bosses. To maximize the contact areas between the bosses and the bearing surfaces of the coupling members, the bosses advantageously are brought to the very peripheries of the holes 24, such as by drilling through a continuous length boss and through the supporting portions simultaneously to thereby form curved surfaces 80a and 82a which form limited extensions of the holes 24. Clearly, any other suitable method of initially securely attaching or joining the bosses to the supporting portions of the upper support members, such as by welding, is also contemplated by the invention. Of primary importance is that the bosses be initially fixedly joined to the upper platform portions so that the eccentricities thereof with respect to the through holes for the coupling members are initially fixed and cannot be inadvertently or accidentally misaligned during field installation.

Referring to FIGS. 9-11, a still further embodiment 310 of the coupling assembly is shown. Here, the upper support platform 318 is in the nature of an angle having an upright connecting portion 360 and a base or leg supporting portion 318d. The wide flange angle 318 is shown connected to a post 312 which is in the form of an I section. The upper support member 318 is connected to the post 312 by means of bolts 84 extending through the holes in the connecting portion 318 and nuts 86, with washers 88 being provided as shown. In the lower region of the upper support member 318, where the thickness there of is greater, a bolt 90 is directly threaded into the upper support member with a washer 92 being interposed as shown. The coupling member 122 is similar to that described in connection with FIGS. 5 and 6, wherein a bolt 148 is screwed into a drilled and threaded hole 56 of the upper cylindrical portion 132.

It will also be noted that two pairs of coupling members are utilized in the embodiment 310. Only one coupling member of each pair is shown in the fragmented sections of FIGS. 9-11. However, it should be clear that, as with the embodiments shown in FIGS. 5 and 6, that a mirror-image arrangement of parts is provided on the other side of the post 312 so that each pair of coupling members 122 is aligned along a direction substantially parallel to the anticipated wind load direction or substantially normal to the face or surface of the sign 14. As is evident in FIG. 11, the bosses 80 and 82 in the nature of inserts as described in connection with FIG. 7, extends across the width of the upper support portion 318d so as to be in contact with both coupling elements 122, 322, and the lower surfaces 348a of the bolts 148.

With respect to the lower support member 320, this is shown in the nature of an anchor or base plate 96 which is connected to a footing 316 by any suitable means, such as nuts 98. Additionally, as best depicted in FIGS. 10 and 11, additional anchors 100 are provided which extend between the anchor base plate 96 and the ground or other supporting surface to provide additional support for the base plate. The operation of the coupling assembly 310 is in all material respects similar to that which has been described above in connection with the other embodiments.

Referring to FIGS. 9 and 11, the holes 324 which receive the coupling members are typically dimensioned to closely correspond to the threaded portions of the bolts 148 which pass therethrough. The clearances are desirably maintained small as to thereby prevent radial movements of the bolts 148 which may change the eccentricity value $e$. However, when negligible or no clearance is provided within the holes 324, the flexion of the supporting portions 318d may cause the upper or lower opposing surfaces of the supporting portions to engage the coupling members and apply moments to the coupling members which tend to bend and break the same. For this reason, it is normally desired that approximately six to eight thousandths clearance be provided to avoid the possibility of such moments, particularly when the thickness of the supporting portions is increased for structural reasons to thereby increase the lengths of the through holes 324. To substantially eliminate this problem, it is possible to somewhat increase the diameter of the holes 324, such as by an eighth of an inch larger than that of the bolt diameter, and to provide a sixteenth of an inch split or snap ring 94 which takes up the increased clearance about the periphery of the bolt 148. Such an arrangement effectively removes the peripheral edges of the hole, at the upper and lower opposing surfaces of the supporting portions 318, from the shank of the bolt 148 sufficiently so as to prevent engagement therewith upon minor deflections or bending of the upper supporting members, including platforms, brackets or angle. Now, the only forces or moments which are applied to the coupling members 122 are those which are applied thereto through the bosses or "load concentrating elements" and not due to the deformations or bending of the upper supporting members. This substantially eliminates an unknown factor in the design and construction of the coupling assemblies and makes the performance thereof more predictable.

The present invention can be utilized with posts of various types and shapes, as suggested above. In some cases, where the cross section of the post is regular or otherwise inconvenient to directly connect to the upper support platform, it may be necessary to provide an adaptor, jig or fixture which facilitates the connection of the post to the upper support members. The post in FIG. 1 can, for example, be welded to the upper platform 18. However, for most installations, one of the embodiments shown in FIGS. 5–11 may be utilized. These coupling members are suitable for light as well as heavy installations. However, the embodiment shown in FIGS. 5–7 is particularly suitable for light installations, for example where the sign area or surface which is exposed to the wind is approximately 20 square feet. Where the signs are larger than approximately 20 square feet, and therefore substantial wind loads may be anticipated, the construction shown in FIGS. 9–11 has been found to be more suitable.

As mentioned above, with the coupling system, the critical distance $e$ between the load concentrating members or bosses and the center lines of the couplings is predetermined and set in the manufacturing process by drilling the holes for the couplings in the correct locations on the upper supporting member with respect to these bosses. This substantially facilitates and prevents error during installation in the field. By providing the large number of configurations or shapes of the upper and lower support members, it is possible to select a coupling assembly which is more suitable for a particular purpose, including for new installations or making existing installations safer. As suggested above, the coupling assemblies of the present invention can be utilized with signposts. However, it is not intended that the invention be limited to such structures and may be utilized in connection with light posts or any other roadside structures which are disposed along the roadside in a position to make it possible for a vehicle to impact against the same.

While the form of apparatus herein described constitutes preferred embodiments of the invention, it is to be understood that the invention is not limited to the precise forms shown and described, and changes may be made therein without departing from the scope of the invention which is defined in the appended claims.

What is claimed is:

1. A breakaway assembly for supporting an elongate post or the like at one end thereof, which post generally defines an axis and may be subjected to transverse forces and negligible vertical forces along a predetermined direction at the other end thereof and to transverse forces proximate to the supported end, the assembly comprising: spaced upper and lower support means, said support means including means for fixedly anchoring the same to a support surface, said upper support means being fixedly connected to the post and having at least two portions thereof spaced from each other along a line substantially parallel to said predetermined direction, each of said spaced portions being provided with at least one opening therethrough, two openings, each on a different one of said associated spaced portions, defining a pair of associated openings, said openings having axes substantially parallel to the axis of the post, said spaced portions having opposing surfaces respectively facing toward and away from said lower support means; a coupling member associated with each opening in said spaced portions, each coupling member extending between an associated spaced portion and said lower support means, each coupling member being provided with a weakened portion disposed between said upper and lower support means and being fixedly connected at one end to said lower support means, the other end of each coupling member extending through an associated opening and defining two spaced bearing surfaces each of which faces a different one of said opposing surfaces of said spaced portions; and protuberance means joined to and projecting from each of said opposing surfaces of said spaced portions, one of said protuberance means being disposed between one of said opposing surfaces and as associated bearing surface of a coupling member and being in abutting relationship against the latter, and another protuberance means being disposed between the other of said opposing surfaces and an associated bearing surface of a coupling member and being in abutting relationship against the latter, each protuberance means being eccentric relative to the axis of an associated opening to dispose the same inwardly in the space between a pair of associated openings.

2. An assembly as defined in claim 1, wherein said protuberance means are fixedly joined to said upper support means.

3. An assembly as defined in claim 2, wherein said protuberance means are integrally formed on said upper support means.

4. An assembly as defined in claim 2, wherein said upper support means includes recess means, and said protuberance means are press-fitted in said recess means.

5. An assembly as defined in claim 4, wherein said upper support means is made of aluminum, and said protuberance means are made of stainless steel.

6. An assembly as defined in claim 5, wherein each of said spaced portions has elongate grooves extending in directions substantially normal to said predetermined direction on the respective opposing surfaces thereof, said grooves being eccentric relative to the axis of the associated openings and disposed inwardly in the space between the pair of associated openings, and said protuberance means comprise inserts dimensioned to be received within said grooves in a press-fit relationship.

7. An assembly as defined in claim 1, wherein the portions of said protuberance means which abut against said bearing surfaces are rounded.

8. An assembly as defined in claim 1, wherein each coupling member includes a central portion adapted to be disposed between said upper and lower support means, and further includes first connecting means for connecting one end of said coupling member to said upper support means, and second connecting means for fixedly connecting the other end of said coupling member to said lower support means.

9. An assembly as defined in claim 8, wherein said first connecting means comprises a threaded portion which projects from said central portion and extends through an associated opening, and a nut which engages said threaded portion, said threaded portion and nut being disposed on opposite sides of said upper support means and each forming one of said bearing surfaces which faces a different one of said opposing surfaces.

10. An assembly as defined by claim 8, wherein said central portion is provided with an axial threaded hole, and said first connecting means comprises a bolt extending through an associated opening and threadedly received with a corresponding threaded hole of a central portion, the head of said bolt and said central portion being disposed on opposite sides of said upper support means, and each forming one of said bearing surfaces which faces a different one of said opposing surfaces.

11. An assembly as defined by claim 1, wherein said weakened portions have circular cross-sections, whereby said coupling members are adapted to be rotated to any angular position about the axes thereof.

12. An assembly as defined in claim 1, wherein said axes of said openings in said upper support member are all substantially parallel to each other and substantially parallel to the axis of the post.

13. An assembly as defined in claim 1, wherein said coupling members are made of a material of sufficient tensile strength to sustain the weight of the post.

14. An assembly as defined in claim 1, wherein said upper support means is in the form of a generally planar platform, said spaced portions of said upper support means comprising end portions of said upper platform.

15. An assembly as defined in claim 1, wherein said upper support means comprises a pair of spaced L-shaped brackets each having a connecting portion connected to a different opposing side of the post and having a supporting portion substantially normal to said connecting portion, said connecting portion of each L-shaped bracket forming one of said two spaced portions of said upper support means.

16. An assembly as defined in claim 15, wherein said connecting portions of said L-shaped brackets are connected to the post by means of threaded fasteners.

17. An assembly as defined in claim 15, wherein said connecting portions of said L-shaped brackets extend laterally beyond the post, and wherein said connecting portions are connected to the post by means of bolts extending between said extensions of said connecting portions of said pair of brackets, and nuts tightened sufficiently on said bolts to draw said connecting portions into pressure abutment against the post.

18. An assembly as defined in claim 17, wherein said connecting portions have surfaces in abutment against the post, and further comprising gripping means for securely engaging the post when said nuts are tightened.

19. An assembly as defined in claim 18, wherein said gripping means comprises elongate teeth having relatively pointed edges suitable for biting the post when the nuts are tightened to prevent relative movement of the post relative to said L-shaped brackets when the post is mounted thereon.

20. An assembly as defined in claim 1, further comprising post lifting means disposed below said weakened portions for lifting the post above said lower support means upon severance of said coupling members and release of the post upon impact by a vehicle.

21. An assembly as defined in claim 20, wherein said lifting means comprises a plate substantially covering said lower support means, said plate having upwardly rising inclined surfaces from each coupling member towards a point intermediate said coupling members, whereby severance of said coupling members at said weakened portions causes at least one of said coupling members above said weakened portions to slidably move over an associated inclined surface and cause the post to rise sufficiently above said lower support means while moving laterally with respect to the same to assure free movement and release of the post upon impact.

22. An assembly as defined in claim 1, wherein two pairs of associated holes are provided on said spaced portions, each pair of openings being aligned along a line substantially parallel to said predetermined direction.

23. An assembly as defined in claim 1, wherein said coupling members are selected to provide a clearance with an associated opening, and further comprising means within said openings to substantially eliminate said clearances and permit said coupling members to freely angularly move with respect to the axes of said openings without engaging said opposing surfaces of said spaced portions.

24. An assembly as defined in claim 23, wherein said means within said openings comprise slip rings.

25. An assembly as defined in claim 1, wherein said coupling members have relatively high tensile strength as compared to their resistance to bending.

26. An assembly as defined in claim 1, wherein said protuberance means are made of a material having a relatively low bearing value, and further comprising planar means disposed between said protuberance means and said bearing surfaces for distributing the stresses applied to said protuberance means over greater surface portions thereof to prevent deformation of the same under stress.

* * * * *